Dec. 10, 1940.    A. DOUTY    2,224,382

ELECTRICAL MEASURING EQUIPMENT

Filed March 21, 1939    2 Sheets-Sheet 1

INVENTOR
Alfred Douty
BY
Synnestvedt + Lechner
ATTORNEYS

INVENTOR
Alfred Douty
BY
Synnestvedt & Lechner
ATTORNEYS

Patented Dec. 10, 1940

2,224,382

UNITED STATES PATENT OFFICE 2,224,382

ELECTRICAL MEASURING EQUIPMENT

Alfred Douty, Elkins Park, Pa., assignor to American Chemical Paint Company, Ambler, Pa., a corporation of Delaware Application March 21, 1939, Serial No. 263,130

21 Claims. (Cl. 175—183)

This invention relates to electrical measuring equipment, and is especially concerned with the measurement of the resistance or resistance-determinative properties of a circuit or any path of current flow.

While the equipment of the invention is capable of use in a variety of ways and for a variety of purposes, it has certain special utility with respect to the measurement of resistance of current flow through solutions of various materials and concentrations. Therefore, for convenience, the invention is described in several forms particularly adapted to the measurement of the resistance of a solution, although it is to be understood that most features of the invention are not limited to this application. In this connection it may be noted that since the resistance of a solution in general varies in accordance with the concentration of the solute, the equipment may desirably be calibrated in units of concentration, and thereby provide a direct reading of the concentration of a solution being measured.

One of the primary objects of the invention is the provision of equipment of the character referred to above which is simple in construction, accurate and direct in its readings and which, furthermore, does not require skilled manipulation or mathematical calculation in the determination of resistance of any electrical circuit, or of the concentration of solutions.

Another important object of the invention is the provision of equipment of the type here involved in which the range of readings is very broad.

Still further, the invention contemplates equipment which is so constructed as to spread out the readings to a substantial degree particularly in certain portions of the total range covered, thereby improving the accuracy of readings. This is of especial importance when the equipment is used for the measurement of solution concentration.

The invention also makes provision for shifting the range of the equipment which is not only of importance from the standpoint of broadening the total range covered, but also since it enables bringing many resistance values being measured into a portion of the scale readings which are materially spread out, and thereby providing high accuracy of readings for almost any value.

Another object of the invention involves the provision of means for compensating for inaccuracies in the readings which would be introduced as a result of inductive or capacitative reactance, or both, in the circuit being measured.

The invention further contemplates equipment which may be employed to measure one out of several resistance determinative properties of a conducting system, another such property being compensated for by means which will be described hereinafter. Thus, for example, in the measurement of the concentration of a solution, bearing in mind that the resistance of the solution varies with two factors—concentration and temperature—the equipment incorporates means for compensating for inaccuracies which would be introduced by difference in temperature, thereby enabling accurate readings of the resistance as determined by the concentration alone. Preferably, in equipment adapted to the measurement of concentration of solutions, the readings of the instrument are obtainable directly in concentration units or figures, such as percentage.

As a still further object, the invention has in view provision of equipment having the characteristics already enumerated, which equipment may readily be built up from standard or commercially available electrical devices and which may readily be operated from a commercial alternating current source such as the ordinary 110 volt, 60 cycle lighting circuits.

In its aplication to equipment for measuring the concentration of solutions, the invention further provides for alternative connection of the equipment with appropriate pairs of electrodes immersed or insertible in a plurality of solution containing cells or tanks.

How the above objects and advantages are attained, together with others which will occur to those skilled in the art, will be apparent from a consideration of the following description referring to the accompanying drawings, in which—

Figure 1:
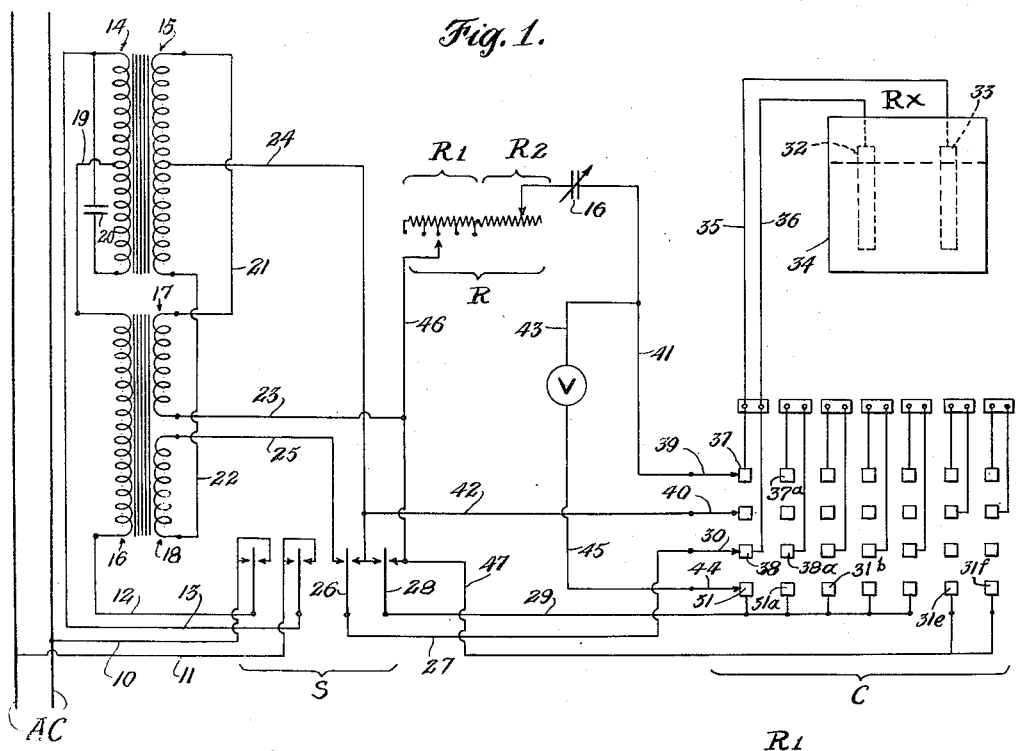
Figure 1 is a wiring diagram of one form of the equipment particularly adapted to the measurement of the resistance or concentration of solutions.
Figure 6:
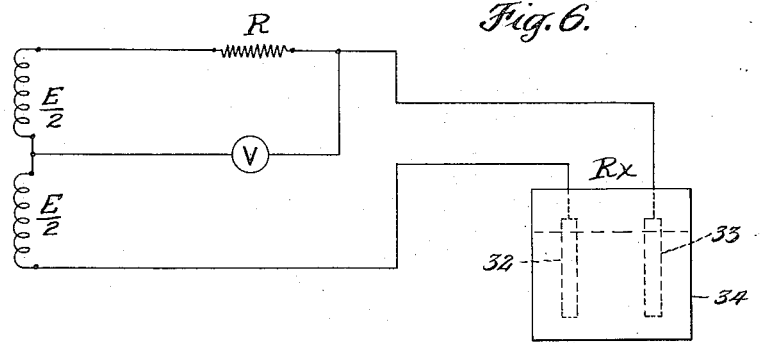
Figures 6 and 7 are simplified diagrams of the basic circuits employed.
Figure 7:
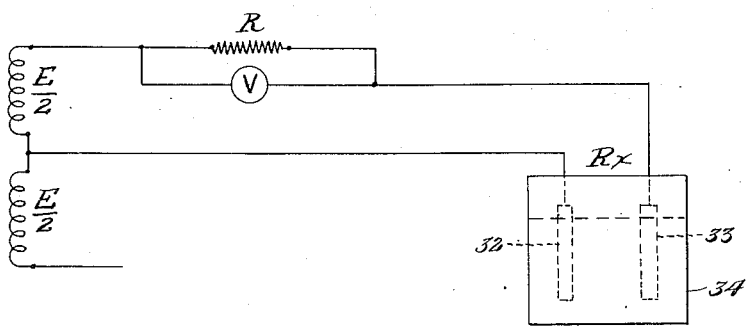

In the description here following, reference is first made to the several devices and connections embodied in the form of Figure 1, and thereafter consideration is given to the electrical values and characteristics of certain parts and instruments, and also to the manner in which the circuits function, this latter discussion being given in connection with the basic circuit diagrams of Figures 6 and 7.

In Figure 1 the common 110 volt 60 cycle lighting circuit is indicated at AC. A four pole double-throw master switch S serves to connect and disconnect the equipment from the source of current and also to alter certain internal circuits as will be described. The source of current is coupled to the contacts for two poles of the switch as is indicated at 10 and 11. In either position of the switch the AC power line is coupled to a constant-voltage transformer by means of connections 12 and 13. This transformer is of a commercially available type, incorporating center tapped primary and secondary windings 14 and 15. A choke coil or saturated core reactor is also included in the power supply and comprises a primary winding 16 and a pair of equal secondary windings 17 and 18. The winding 16 is coupled in series with a portion of the winding 14 by means of the connection 19. A condenser 20 is connected across the primary winding 14.

As to the secondary windings 15, 17 and 18, it will be noted that opposite poles of the two windings 17 and 18 are coupled respectively to opposite ends of the winding 15 as by the connections 21 and 22. The center tap connection 24 of the winding 15 and the connections 23 and 25 of the two equal windings 17 and 18 provide two substantially equal and in phase, low voltage sources of current. For reasons which need not be considered in detail herein, the value of these two sources of current remains substantially constant even with substantial fluctuations in voltage in the alternating current power supply line AC.

The foregoing two sources of equal and constant E. M. F. are used in association with a voltmeter V and a resistance generally indicated at R. The center tap connection 24 extends and is coupled to opposite contacts for the two right-hand poles of switch S, as is shown in Figure 1, the connections 23 and 25 being associated with the other contacts for these switch parts. The switch blade or equivalent part 26 is coupled by means of wire 27 with switching contact 30 of a four pole multi-throw switch generally indicated by the letter C. Switch blade 28 is connected by means of wire 29 with a series of contacts 31, 31a, 31b, etc., of switch C. This switch serves the purpose of selectively connecting any pair of a group of pairs of electrodes, one of which is shown at 32 and 33, into the circuits of the equipment for measurement purposes. Each pair of electrodes such as those indicated at 32 and 33, may be positioned in a cell or tank 34, the electrodes having connections 35 and 36 which extend to contacts 37 and 38 of the switch C. Similarly, contacts 37a and 38a may be coupled to the electrodes in a second cell and so on, throughout the series of contacts provided in the switch C.

The switching elements 39 and 40 of switch C are coupled, respectively, to the resistor R (by means of connection 41) and to the center tap wire 24 of the power supply (by means of connection 42). The switching element 39 is also coupled to one side of the voltmeter V by connection 43, the other side of the voltmeter being connected with the switch element 44 by the wire 45. A connection 46 interconnects resistor R with one side (23) of one of the two equal secondary windings 17 and 18.

This same power supply connection (23) is also coupled by wire 47 with certain of the contacts 31e and 31f of the switch C. Note that the connections for each vertical series of contacts incorporating 31e or 31f are differently arranged from those in the remaining vertical groups 31, 31a, etc. The purpose of this will be described more fully hereinafter, although it is noted at this point that switch C may have any desired number of groups of contacts and may incorporate any desired number of connections of the two types indicated.

For the purpose of describing the fundamental characteristics and operation of the equipment, reference is made to the diagrammatic showing of Figures 6 and 7. With switch S thrown to the left when viewed as in Figure 1, the basic circuit provided is that diagrammatically shown in Figure 6, provided switch C is adjusted to couple the equipment to a series of contacts of the type represented by 31—38—37.

In Figure 6, $$\frac{E}{2}, \frac{E}{2}$$

indicate the two sources of equal voltage, R the resistor and V the voltmeter. For convenience, the resistance to flow of current from one electrode to the other in the cell 34 is designated $Rx$.

The voltmeter has high resistance relative to the value of R.

If it be assumed for the moment that both the internal circuits of the equipment and the cell containing electrodes 32 and 33 have negligible reactance, the reading of the voltmeter will accurately reflect the relative values of R and $Rx$. This will be apparent from the following:

If $$\frac{E}{2}$$

be chosen to represent the voltage of either of the two sources, and if V represents the indication of the voltmeter in volts, then—

(1) $$V = \frac{E}{2} - E\frac{R}{R+Rx} = \frac{E}{2}\frac{Rx-R}{Rx+R} = \frac{E\frac{Rx}{R}-1}{2\frac{Rx}{R}+1}$$

Thus it will be seen that with the circuit of Figure 6, for values of $Rx$ greater than R, the reading of the voltmeter increases with increase in the value $Rx$, and also that the indications of the voltmeter are greatly affected by changes in the relation between R and $Rx$ when $Rx$ is not greatly different from R, and are affected less when $Rx$ is much greater than R.

By calibrating the voltmeter in units of resistance, a direct reading may in this way be obtained of the resistance of an external conducting system, such as the cell 34 with its solution and electrodes immersed therein. Preferably, where the equipment is being employed for the purpose of determining the concentration of a solution, the meter is calibrated in units of concentration, as will be mentioned more fully hereinafter.

When the switch S is thrown to the right, the basic circuit provided is that indicated in Figure 7. In this circuit it will at once be seen that only one of the sources of current is employed, and also that the voltmeter is differently coupled, being in parallel with the resistance R alone.

Here also the indications of the voltmeter depend upon the relative values of R and Rx.

Assigning the same values as above, then—

$$(2) \quad V = \frac{E}{2}\frac{R}{Rx+R} = \frac{E}{2}\frac{1}{\frac{Rx}{R}+1}$$

In contrast with the circuit of Figure 6, it will be seen that for values of Rx greater than R, the indications of the voltmeter will now decrease with increase of Rx and, in addition, the variations in indication of the voltmeter are greatest when Rx is substantially greater than R, the indications being affected to a smaller degree when the value of Rx approaches the value of R.

Here also the voltmeter may be calibrated in units of resistance or concentration, although the calibrations will increase in a direction opposite to the voltage indications.

From comparison of the two equations (1 and 2) given above, it will be seen that for a value of Rx equal to twice that of R, the indication of the voltmeter will be the same with either of the two circuits. At this particular value of Rx, the voltage indication is given by $$V = \frac{E}{6} = \frac{1}{3}\left(\frac{E}{2}\right)$$

In view of the above, if the voltage of either of the sources $$\left(\frac{E}{2}\right)$$

and the range of the voltmeter be so selected that the maximum or approximately maximum voltmeter reading is equal to $$\frac{1}{3}\left(\frac{E}{2}\right)$$

substantially the entire scale of the meter will be traversed in the direction from minimum to maximum readings as the value of Rx increases from a value equal to that of R up to a value equal to twice that of R, when switch S is thrown to the left (providing the circuit of Figure 6). With switch S thrown to the right (providing the circuit of Figure 7), the voltmeter scale will be traversed in the direction of maximum to minimum readings as the value of Rx increases from twice that of R to infinity. Thus, all that is required to obtain readings throughout the range running up from the value of R to infinity is that the switch S be thrown either to the left or to the right, depending upon whether the resistance Rx falls above or below a point equal to twice the value of R. In this way a very wide range of readings is obtainable by the use of only a single voltmeter.

Figure 2:
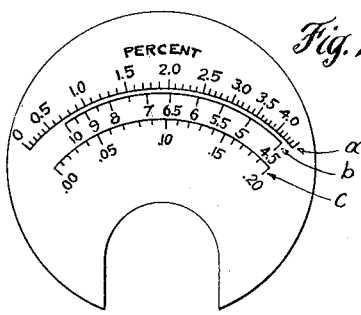
Figure 2 is a face view of a scale of the type preferably associated with the meter which is used in the equipment.

While the normal calibrations of the meter in volts may, of course, be employed in association with conversion tables in order to secure readings of resistance, I prefer to directly calibrate the meter scale either in units of resistance or in units of concentration (where the equipment is used for measuring the concentration of solutions), or in both. In Figure 2 there is illustrated a suitable scale for the voltmeter calibrated in units of concentration, i. e., in percentage of concentration. The scales a and b are calibrated, respectively, for the circuits of Figures 7 and 6. Since resistance values and concentration values usually vary inversely, in scale a the units increase from zero at the left to a point in the neighborhood of 4.5 at the right, and scale b progresses in the opposite direction from 4.5 to 10. The zero concentration percentage indication (at the left end of scale a) represents pure solvent, which, in most instances, would be water. While the percentage concentration calibrations could be carried on scale b of the meter above the point shown in Figure 2 (at the left end of scale b), this is not usually necessary, since the range covered is adequate for most purposes. Furthermore, as mentioned hereinafter, the equipment may also incorporate means for shifting the total range of readings.

It will be understood that the calibration shown in Figure 2 is suitable only for one particular solvent and solute, and that the calibrations would vary where the equipment is being used to measure the concentration of other solutions.

As stated above, one of the characteristics of the circuit of Figure 6, the readings for which appear on scale b in Figure 2, is that for values of Rx not far different from R (the left end portion of scale b), a relatively small change in the value of Rx will result in a rather large deflection of the voltmeter. While the percentage concentration figures appearing toward the left end of scale b are closer together than those toward the right end (at which the value of Rx is substantially greater than that of R) the reason for this is that with many solutes the decrease in resistance of the solution with increase in concentration becomes very materially smaller in the higher range of concentration represented by the left end of scale b. Therefore, the circuit of Figure 6 is especially suitable for measurement of concentration in the said range in which the decrease in resistance is small per unit of increase in concentration, the effect being to spread out the readings of concentration in the range in which the resistance is changed only slightly with increase or decrease of concentration.

Figure 3:
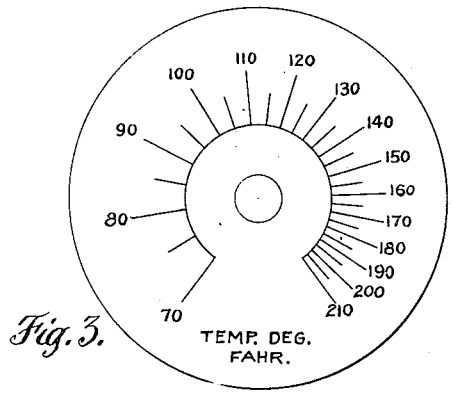
Figure 3 is a face view of the dial or scale of a temperature compensating instrument.

When the equipment is employed in the measurement of concentration of solutions, as in Figure 1, I preferably employ means for compensating for differences in temperature of the solution being measured. The resistance of the solution varies in accordance with both concentration and temperature, and if the concentration is the desired reading, the temperature must be compensated for. To accomplish this, the resistor R or a portion R2 thereof is made variable. The variable resistor is preferably of the stepless sliding contact type so as to provide for very accurate adjustment. The resistor R2 is conveniently associated with a controlling member movable over the scale shown in Figure 3, which scale is calibrated in degrees of temperature. To compensate for the temperature factor, therefore, it is only necessary to determine the temperature of the solution being measured and then to set the resistor R2 at that value, in the manner which is apparent from inspection of Figure 3.

I propose also to provide for extension of the total range of the equipment by making at least a portion of the resistor R adjustable in steps. However, this provision is only applicable with accuracy where the calibrations of the meter are in units of resistance or the equivalent. It is not applicable with accuracy where the meter is calibrated in units of solution concentration, since resistance and concentration do not vary in linear relationship.

Figure 4:
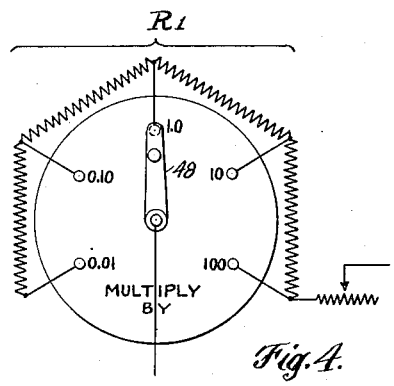
Figure 4 is a diagrammatic showing of a system for shifting the range of readings of the equipment.

For the purpose of shifting the range, in Figure 1, the section R1 of the resistor R is shown as being provided with five taps, which also appear in the showing of Figure 4, wherein the coupling of this section of the rheostat to a control switch 48 is illustrated. With a meter calibration in resistance units running, for example, from 0 to 10, the value of resistance R1 between the several taps is such that upon movement of the switch 48 from one tap to an adjacent tap, the entire scale reading from 0 to 10 is shifted in one direction or the other an amount equivalent to the 0–10 range. For instance, with the switch in the position shown in Figure 4, direct readings of resistance would show up on the scale of the meter. If the switch 48 be shifted to the left to the next contact, the correct readings are obtained by multiplying the reading of the scale by 0.10. If the switch 48 is shifted in the opposite direction from the position shown in Figure 4, the correct readings are obtained by multiplying the scale reading by 10. In this way, an extremely broad range of readings is obtainable and, in addition, it is possible to bring many different values of $Rx$ (the external resistance being measured) into a range of meter readings which is substantially spread out, thereby enabling a very accurate reading to be made for almost any value of $Rx$.

While I prefer to employ divisions in the resistance R1 of such size as to provide for multiplication or division of the meter readings in the manner described, it will be apparent that other steps may be chosen, although in accordance with the invention, they would preferably be steps which are equal to multiples or exact divisors of calibration units of the meter.

It should be understood in connection with the use of the resistor R1, which is adjustable in steps, and the resistor R2, which is adjustable substantially continuously for temperature compensation, that in most if not all circumstances, completely accurate temperature compensation can only be effected with a given setting of resistor R1, unless the temperature compensating resistor is provided with several calibration scales corresponding to the different positions of adjustment of resistor R1. The provision of several temperature compensating scales is, however, contemplated by the invention. Still further, where the meter is calibrated directly in units of resistance and where no temperature compensation is required, the resistor R2 may be eliminated or the values of R1 appropriately arranged so as to afford the desired indications with resistor R2 positioned at some one predetermined value.

In the measurement of the concentration of solutions I have further found that an inaccuracy or distortion of the entire scale reading might arise from another source, in the absence of compensating means. This source is the gaseous film with which one or both of the electrodes become coated, the action of the film being equivalent to a large condenser in series. Specifically, the distortion which might be introduced from this source tends to prevent the meter from returning to zero position, for any value of $Rx$, so that the lower end of the scale (in the absence of compensation means) would become so compressed as to impair accuracy of reading. The capacitance due to the film on the electrodes, however, ordinarily has quite low impedance, so that it has little effect upon the indications of the apparatus except as the value of $Rx$ approaches the value of R, i. e., in the lower end of the range covered when the switch S is set to employ the circuit of Figure 6.

The above difficulty and the inaccuracy which might be introduced thereby may be compensated for by the insertion of an appropriate reactor 16 in series in that branch of the circuit which includes the resistor R and its electrically adjacent source of current but which does not include the voltmeter or the other of the two sources of current. As shown in Figure 1, this reactor may desirably take the form of a condenser which may be variable. For many purposes, however, such as the measurement of the concentration of solutions in any one of a number of physically identical cells, a condenser of fixed capacity chosen to match the external reactance due to the electrode film is satisfactory.

Referring again to switch C of Figure 1 and especially to the arrangement of contact connections such as those shown in the two right-hand vertical series, tracing the circuits will show that when switch C is adjusted to couple the equipment with a cell 34 associated with either of these two right-hand series of contacts, in either position of switch S the measuring circuit is in accordance with the showing of Figure 7. This arrangement of contact connection in switch C may, therefore, be employed where one or more of the cells which may alternatively be coupled to the equipment are of the type in which the concentration is normally or at all times in a very low range. It is contemplated that for this purpose the cells in which the solution to be measured is placed shall be of quite different physical characteristics from those associated with the other type of connection in switch C. Because of this difference, a different calibration scale on the meter is employed, this scale being indicated by the letter $c$ in Figure 2, and from examination thereof it will be seen that the percentage concentration figures are very greatly spread out, running from 0 to .2 throughout substantially the entire range.

For the purpose of ensuring that with any particular connection a reading is taken from the proper scale of the meter of Figure 2, different colors may be employed on the several scales of the meter, and corresponding colors used in association with the positions of switch C, or the binding posts associated therewith for connection with the respective cells 34. In addition it is also contemplated that the switch S be so marked that its two positions will be properly associated with scales $a$ and $b$ of the meter.

Ordinarily, in use of the equipment, assuming that switch C is adjusted to the position of Figure 1 (or to a position in which the same type of connection is provided), if the reading of the meter is "off scale" the switch S need only be thrown to the other position and the reading will, of course, appear on the other scale of the meter. However, since an AC voltmeter does not distinguish between "positive" and "negative" voltages, for values of $Rx$ lower than R, a false indication might be secured from the equipment in instances where not even the approximate value of $Rx$ is known. Such false indication may readily be detected by adjusting the value of resistor R1 and noting whether the meter indications are now multiplied or divided in the manner indicated on the dial or resistor R1. If the indication of the voltmeter is correctly changed by this adjustment of resistance R1, the original reading is correct. If the indications are not correctly changed, the resistor R1 is moved by steps to other taps until successive indications of the meter are changed correctly in accordance with the indicia on the scale for resistor R1 (see Figure 4).

While any false reading may readily be detected in the above manner, for the most part not even this manipulation would be necessary, for the reason that in actual practice the approximate magnitude of the resistance to be measured is ordinarily known.

Figure 5:
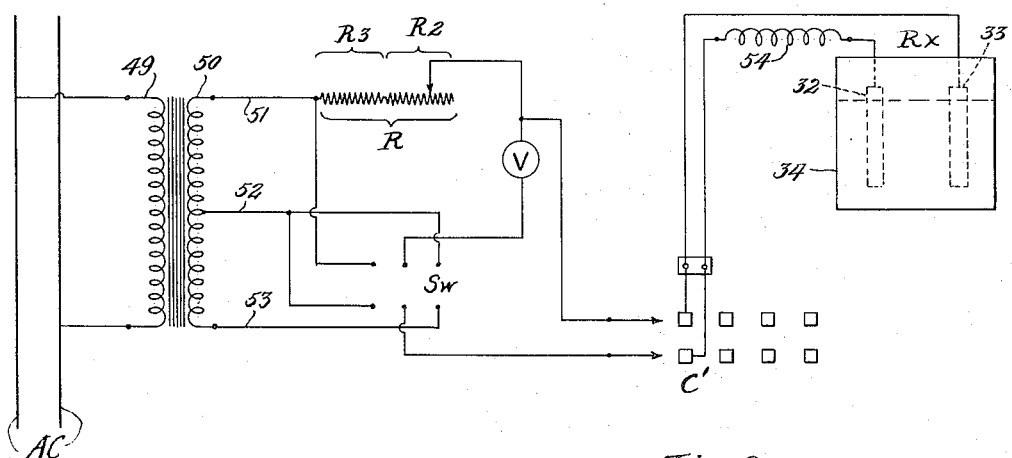
Figure 5 is a wiring diagram of a modified form of equipment.

Turning now to the arrangement shown in Figure 5, it will be noted that the source of current here indicated comprises a transformer having its primary 49 coupled to the AC power line as before. A simple center tapped secondary 50 is here shown as providing the two sources of current through connections 51, 52 and 53. The resistor R and the meter V may both be of the type described above, and the circuits, in general, are similar, incorporating a switch Sw for the purpose of changeover from the basic circuit of Figure 6 to that of Figure 7. A double pole multi-throw switch C' is also here used to alternatively connect the measuring circuits with any one of a number of cells such as 34, having electrodes 32 and 33 immersed therein.

One of the modifications adopted in the arrangement of Figure 5 is the provision of two sections R2 and R3 in the resistor R, the section R2 being of the type described above, and the section R3 being a fixed section, in view of which the total range of the equipment is fixed (except, of course, for the compensation for temperature through the medium of R2). While I have found that the types of resistors just mentioned and described above are preferable, it is also quite feasible to employ different arrangements. For instance, only a single resistor may be employed, this being variable in a substantially continuous fashion throughout its entire length.

While the type of current supply (49—50) shown in Figure 5 is subject to some slight voltage fluctuation depending upon the voltage of the line AC, this arrangement is of advantage since the transformer 49—50 delivers an essentially pure sine wave voltage, and because of that fact the capacitance resulting from the gaseous film at the surfaces of the electrodes may be neutralized or compensated for either externally or internally of the equipment. As shown in Figure 5, this capacitance is neutralized by insertion of an inductive reactance 54. This reactance has been placed in the connections between the electrodes and the contacts of switch C', it being the intention that where the various cells coupled to the several contacts of the switch C' are not physically identical, different inductive reactance values would be required for the several cells and could be inserted in their individual connections. If the cells are in fact physically identical, the appropriate reactance could, of course, be inserted in the circuit internally of the equipment.

With a source of current of essentially pure sine wave form such as provided by the transformer 49—50 in Figure 5, the capacitance of the film at the surfaces of the electrodes may also be compensated for by equivalent capacitance inserted in the circuit in the same manner as in Figure 1.

Still further, with a current of pure sine wave form, inductive reactance in the circuit whose resistance is being measured may, if desired, be compensated for by appropriate capacitative reactance inserted in the circuit either externally or internally of the equipment. In the event of compensating for inductive reactance in the general manner of Figure 1, in place of the capacitative reactance represented by the condenser 16, an appropriate inductive reactance would be inserted.

In conclusion, it is pointed out that the equipment of the present invention provides for accurate and direct readings of resistance and/or concentration over a wide range and in a manner which makes possible compensation for one or more of several resistance determinative properties of a circuit being measured. As adapted to the measurement of the concentration of solutions, the equipment is highly flexible and may readily be employed to alternatively couple the measuring circuits with any one of a plurality of cells.

While reference has been made throughout the foregoing specification to the measurement of resistance values, it is to be understood that measurement of conductance may, of course, be effected and the meter calibrated in any appropriate units of conductivity.

In considering the appended claims, it is to be understood that where reference is made to calibration in units indicating resistance values, or similar expressions, the language is not intended to be limited to any particular scale of resistance units, nor even to a scale based on a regular arithmetic progression. With respect to the reference in the claims to calibrations in units of concentration, it is also obvious that any appropriate measurement scale is contemplated, such as percentage by weight, percentage by volume, pounds per gallon, etc.

I claim:

1. Equipment for measuring the resistance of a circuit including, in combination, two alternating current sources in phase and of substantially equal voltage, a resistor, an alternating current voltmeter of high resistance compared with that of said resistor, and switching means providing for series connection of the two current sources, said circuit and the resistor and for parallel connection of the voltmeter across said resistor and the source of current adjacent thereto, the switching means further providing for alternative connection of the parts with the resistor and said circuit in series with one of the current sources, and with the meter in parallel with the resistor.

2. Equipment in accordance with claim 1 in which the full-scale range of the voltmeter is approximately one-third of the voltage of one of said sources.

3. Equipment in accordance with claim 1 in which the voltmeter is provided with two serially calibrated scales having indicia increasing in opposite directions.

4. Equipment in accordance with claim 1 in which the full-scale range of the voltmeter is approximately one-third of the voltage of one of said sources, and in which the voltmeter is provided with two serially calibrated scales having indicia respectively increasing and decreasing from a common value adjacent the high voltage end.

5. Equipment in accordance with claim 1 in which the voltmeter is calibrated in units of resistance, and in which at least a portion of said resistor is variable in steps providing for shift in the range of the equipment in corresponding steps, said steps being equal to multiples or exact divisors of calibration units of said meter.

6. Equipment in accordance with claim 1 for measuring the resistance of a circuit incorporating reactance, further characterized by the inclusion of a reactor in series with the resistor and the source of current adjacent thereto but not in series with the voltmeter, said reactor having a value appropriate to compensate for the reactance of the circuit being measured.

7. Apparatus for indicating the resistance of an external conducting system, including, in combination, two sources of alternating current in series, the E. M. F.'s of said sources being substantially equal and substantially in phase; a variable resistor in series with said sources of alternating current; a voltmeter of high resistance relative to that of said resistor even when the latter is in its position of maximum adjustment; and means for connecting an external conducting system to the apparatus and for selectively connecting the external conducting system in series with said variable resistor and with one or both of said sources of alternating current, and simultaneously connecting the voltmeter in parallel with the variable resistor alone, when only one of said sources of current is in the circuit, or in parallel with the variable resistor and its electrically adjacent source of current, when both of the sources of the current are in the circuit.

8. Equipment for measuring the resistance of a circuit including, in combination, two alternating current sources in phase and of substantially equal voltage, a resistor, an alternating current voltmeter of high resistance as compared with that of said resistor, and means interconnecting said elements and providing for series connection of the two current sources, said circuit and the resistor and for parallel connection of the voltmeter across said resistor and the source of current adjacent thereto.

9. Equipment in accordance with claim 8 for measuring the resistance of a circuit incorporating reactance, further characterized by the inclusion of a reactor in series with the resistor and the source of current adjacent thereto but not in series with the voltmeter, said reactor having a value appropriate to compensate for the reactance of the circuit being measured.

10. Equipment in accordance with claim 8 in which the full-scale range of the voltmeter is approximately one-third of the voltage of one of said sources.

11. Equipment in accordance with claim 8 in which the voltmeter is calibrated in units corresponding to resistance values being measured.

12. Equipment for measuring one out of a plurality of resistance determinative properties of a circuit including, in combination, two alternating current sources in phase and of substantially equal voltage, a variable resistor, an alternating current voltmeter of high resistance as compared with that of said resistor, and means interconnecting said elements and providing for series connection of the two current sources, said circuit and the resistor and for parallel connection of the voltmeter across said resistor and the source of current adjacent thereto, at least a portion of said resistor being variable to compensate for a resistance determinative property which it is not desired to measure.

13. Equipment for measuring the resistance of a circuit incorporating reactance including, in combination, two alternating current sources in phase and of substantially equal voltage, a resistor, an alternating current voltmeter of high resistance as compared with that of said resistor, and means interconnecting said elements and providing for series connection of the two current sources, said circuit and the resistor and for parallel connection of the voltmeter across said resistor and the source of current adjacent thereto, and a reactor inserted in series in any portion of the entire circuit which carries the entire current flowing through the circuit being measured, said reactor being of substantially equal and opposite effect as compared with the reactance of the circuit being measured.

14. Equipment for measuring the resistance of a circuit incorporating reactance including, in combination, two alternating current sources in phase and of substantially equal voltage, a resistor, an alternating current voltmeter of high resistance as compared with that of said resistor, and means interconnecting said elements and providing for series connection of the two current sources, said circuit and the resistor and for parallel connection of the voltmeter across said resistor and the source of current adjacent thereto, and a reactor in series with said sources of current, the resistance and the circuit being measured and being of sign value appropriate to compensate for the reactance of the circuit whose resistance is being measured.

15. Equipment for measuring the resistance of a circuit incorporating reactance including, in combination, two alternating current sources in phase and of substantially equal voltage, a resistor, an alternating current voltmeter of high resistance as compared with that of said resistor, a reactor and means interconnecting said elements and providing for series connection of the two current sources, said circuit, the reactor and the resistor, and for parallel connection of the voltmeter across said reactor, the resistor and the source of current adjacent thereto, the reactor being of effect and value substantially matching the reactance of the circuit being measured.

16. Equipment for measuring the resistance of a circuit incorporating capacitative reactance including, in combination, two alternating current sources in phase and of substantially equal voltage, a resistor, an alternating current voltmeter of high resistance as compared with that of said resistor, and means interconnecting said elements and providing for series connection of the two current sources, said circuit and the resistor and for parallel connection of the voltmeter across said resistor and the source of current adjacent thereto, and an inductive reactor inserted in series in any portion of the entire circuit which carries the entire current flowing through the circuit being measured, said reactor being of substantially equal but opposite effect as compared with the reactance of the circuit being measured.

17. Equipment for measuring the resistance of a circuit incorporating capacitative reactance including, in combination, two alternating current sources in phase and of substantially equal voltage, a resistor, an alternating current voltmeter of high resistance as compared with that of said resistor, a capacitative reactor and means interconnecting said elements and providing for series connection of the two current sources, said circuit, the reactor and the resistor, and for parallel connection of the voltmeter across said reactor, the resistor and the source of current adjacent thereto, the reactor being of value substantially matching the reactance of the circuit being measured.

18. Equipment for measuring the concentration of a solution including, in combination, a pair of electrodes immersed in said solution, two alternating current sources in phase and of substantially equal voltage, a resistor, an alternating current voltmeter of high resistance as compared with that of said resistor, and means providing for series connection of said two current sources, said electrodes and the resistor and for parallel connection of the voltmeter across the resistor and the source of current adjacent thereto, the voltmeter being calibrated in units of concentration.

19. Equipment for measuring the concentration of a solution including, in combination, a pair of electrodes immersed in said solution, two alternating current sources in phase and of substantially equal voltage, a resistor, an alternating current voltmeter of high resistance as compared with that of said resistor, and switching means providing for series connection of said two current sources, said electrodes and the resistor and for parallel connection of the voltmeter across the resistor and the source of current adjacent thereto, the switching means further providing for alternative connection of the parts with the resistor and said circuit in series with one of the current sources, and with the meter in parallel with the resistor, said meter being calibrated in units of concentration.

20. Equipment for measuring the concentration of a solution including, in combination, a pair of electrodes immersed in said solution, two alternating current sources in phase and of substantially equal voltage, a resistor, an alternating current voltmeter of high resistance as compared with that of said resistor, and switching means providing for series connection of said two current sources, said electrodes and the resistor and for parallel connection of the voltmeter across the resistor and the source of current adjacent thereto, the switching means further providing for alternative connection of the parts with the resistor and said circuit in series with one of the current sources, and with the meter in parallel with the resistor, said meter being calibrated in units of concentration, at least a portion of said resistor being variable and being calibrated in degrees of temperature to provide for compensation for differences in temperature of the solution being measured.

21. Equipment for measuring the concentration of a solution including, in combination, a pair of electrodes immersed in said solution, two alternating current sources in phase and of substantially equal voltage, a resistor, an alternating current voltmeter of high resistance as compared with that of said resistor, and switching means providing for series connection of said two current sources, said electrodes and the resistor and for parallel connection of the voltmeter across the resistor and the source of current adjacent thereto, the switching means further providing for alternative connection of the parts with the resistor and said circuit in series with one of the current sources, and with the meter in parallel with the resistor, said meter being calibrated in units of concentration, and a reactor in the connections providing for compensation of the reactance set up as a result of the development of a gaseous film on electrode surfaces.

ALFRED DOUTY.